(12) United States Patent
Sories et al.

(10) Patent No.: US 8,837,395 B2
(45) Date of Patent: Sep. 16, 2014

(54) METHOD AND ENTITY FOR CONVEYING DATA UNITS

(75) Inventors: Sabine Sories, Aachen (SE); Christian Hoymann, Aachen (DE); Norbert Niebert, Aachen (DE)

(73) Assignee: Optis Cellular Technology, LLC, Plano, TX (US)

( * ) Notice: Subject to any disclaimer, the term of this patent is extended or adjusted under 35 U.S.C. 154(b) by 237 days.

(21) Appl. No.: 13/140,691

(22) PCT Filed: Dec. 19, 2008

(86) PCT No.: PCT/EP2008/068055
§ 371 (c)(1),
(2), (4) Date: Aug. 26, 2011

(87) PCT Pub. No.: WO2010/069400
PCT Pub. Date: Jun. 24, 2010

(65) Prior Publication Data
US 2011/0296719 A1    Dec. 8, 2011

(51) Int. Cl.
*H04W 72/00*    (2009.01)
*H04W 72/04*    (2009.01)
*H04L 12/911*    (2013.01)

(52) U.S. Cl.
CPC ............ *H04W 72/04* (2013.01); *H04L 47/782* (2013.01)
USPC ............................ 370/329; 370/465; 455/450

(58) Field of Classification Search
USPC ..................... 370/329, 331, 341, 395.52, 468
See application file for complete search history.

(56) References Cited

U.S. PATENT DOCUMENTS

| | | | |
|---|---|---|---|
| 6,507,567 B1 * | 1/2003 | Willars | 370/321 |
| 6,901,065 B1 * | 5/2005 | Ehrstedt et al. | 370/341 |
| 6,941,132 B2 * | 9/2005 | Van Lieshout et al. | 455/418 |
| 7,242,674 B2 * | 7/2007 | Jin | 370/329 |
| 7,457,263 B2 * | 11/2008 | Shepherd | 370/329 |
| 7,483,436 B2 * | 1/2009 | Semper | 370/395.52 |
| 7,539,212 B2 * | 5/2009 | Kekki et al. | 370/469 |
| 7,715,435 B2 * | 5/2010 | Yeo et al. | 370/469 |
| 7,869,414 B2 * | 1/2011 | Isokangas et al. | 370/341 |
| 7,903,578 B2 * | 3/2011 | Fischer | 370/252 |
| 7,996,744 B2 * | 8/2011 | Ojala et al. | 714/748 |
| 8,111,630 B2 * | 2/2012 | Kovvali et al. | 370/252 |
| 8,179,903 B2 * | 5/2012 | Gupta et al. | 370/400 |
| 8,200,252 B2 * | 6/2012 | Lee et al. | 455/458 |

(Continued)

FOREIGN PATENT DOCUMENTS

| | | |
|---|---|---|
| EP | 1650907 A2 | 4/2006 |
| GB | 2416958 A | 2/2006 |

*Primary Examiner* — Brian O'Connor
(74) *Attorney, Agent, or Firm* — Vincent J. Allen; James H. Ortega; Carstens & Cahoon, LLP

(57) ABSTRACT

A method of conveying data unit traffic from a radio terminal in a mobile communication system that comprises an access network (E-UTRAN) and a core network (Evolved Packet Core) is described. It comprises:—receiving (S31) a service request message for data unit communication from said radio terminal, and—performing (S32) a conveying decision procedure, and on the basis of an outcome of said conveying decision procedure, associating a radio channel between an access network entity and a radio terminal with one of —a channel to a dedicated data unit processing entity (P-GW) in said core network for conveying data units from said radio terminal to said dedicated data unit processing entity for processing (S33), and—an access network channel for conveying data units from said radio terminal within said access network (S34).

20 Claims, 12 Drawing Sheets

(56) References Cited

U.S. PATENT DOCUMENTS

| | | |
|---|---|---|
| 8,228,869 B2 * | 7/2012 | Ahluwalia .................... 370/331 |
| 8,244,242 B2 * | 8/2012 | Zhang et al. ............... 455/435.1 |
| 8,259,677 B2 * | 9/2012 | Olsson et al. ................. 370/331 |
| 8,363,664 B2 * | 1/2013 | Ramankutty et al. ......... 370/401 |
| 8,401,068 B2 * | 3/2013 | Ulupinar et al. .............. 375/240 |
| 8,462,696 B2 * | 6/2013 | Vesterinen et al. ........... 370/328 |
| 8,599,778 B2 * | 12/2013 | Zisimopoulous et al. .... 370/329 |
| 8,705,553 B2 * | 4/2014 | Rune ............................. 370/428 |
| 2005/0090260 A1 | 4/2005 | Semper |
| 2009/0129342 A1 * | 5/2009 | Hwang et al. ................. 370/331 |
| 2010/0017861 A1 * | 1/2010 | Krishnaswamy et al. ........ 726/7 |
| 2010/0075678 A1 * | 3/2010 | Akman et al. ................ 455/436 |
| 2010/0103863 A1 * | 4/2010 | Ulupinar et al. .............. 370/315 |
| 2011/0075621 A1 * | 3/2011 | Sung et al. .................... 370/329 |
| 2011/0090879 A1 * | 4/2011 | Hamiti et al. ................. 370/338 |

* cited by examiner

METHOD AND ENTITY FOR CONVEYING DATA UNITS

TECHNICAL FIELD

The present invention relates to network entities and methods for conveying data units in a mobile communication system.

BACKGROUND

In the field of mobile communications it is known to provide a basic architecture in which the mobile communication system comprises an access network arranged for giving radio terminals access to the communication system, and a core network that comprises entities for providing higher level communication control, such as call switching or data unit routing for data units of a given network layer protocol, such as the Internet Protocol (IP).

FIG. 1 shows an example, in which a mobile communication network comprises entities such as base stations 100 and 101, which may exchange control signalling with a control entity 102 that can provide functions such as resource allocation (e.g. channel or bearer allocation). The base stations 100, 101 belong to an access network, and can e.g. be parts of a UMTS terrestrial radio access network (UTRAN) or an Evolved UTRAN (E-UTRAN), which is also referred to as Long Term Evolution (LTE). In this case, the entities 100 and 101 can be so-called eNodeBs, and control entity 102 can in this case be a so-called Mobility Management Entity (MME).

FIG. 1 furthermore shows entities 106 and 107 that belong to the core network, and which can e.g. be appropriate gateways, such as a serving gateway (S-GW) 106 and a packet data network gateway (PDN-gateway or P-GW) 107. The elements can thus e.g. belong to an Evolved Packet Core (EPC). The control entity 102 typically also belongs to the core network.

Furthermore, FIG. 1 shows user equipment (UE) or radio terminals 103, 104 and 105 that receive access via the base stations 100 and 101.

The individual entities are connected with one another over appropriate interfaces that are selected in accordance with the underlying definitions and protocols used in the given system. For example, if the core network is an EPC and the radio access network an LTE access network, then channels 108, 109 between radio terminals and the base station 100 (eNodeB) could be LTE radio bearers, just like channel 115, whereas the base station 100 can be connected to the core network entity 106 (e.g. a service gateway) via an IP-based S1 interface that provides a channel 112. The logical interface between base stations 100 and 101 can e.g. be an IP-based X2 interface providing a channel 110. The interface between core network elements 106 and 107 (e.g. PDN-gateway) for providing channel 113 can be provided according to the S5 interface or in roaming cases the S8 interface, as e.g. described in 3GPT TS 23.401. The interfaces between control entity 102 and base stations 100 and 101 for providing channels 111 and 114 can e.g. also be an IP-based S1 interface.

FIG. 7 shows an example of a protocol hierarchy used for communication between the radio terminal/user equipment 103, the base station (e.g. eNodeB) 100, the core network entity 106 (e.g. serving gateway) and the core network entity 107 (e.g. PDN-gateway). In this example, an LTE radio bearer between the user equipment 103 and the eNodeB 100 is established in accordance with the packet data convergence protocol (PDCP) and mapped onto a tunnel established according to the GPRS tunnelling protocol (GTP), such that the LTE bearer between the user equipment 103 and the eNodeB 100 is concatenated with the GTP tunnel established between eNodeB 100 and PDN-gateway 107. In this way, IP data units from user equipment 103 are conveyed to PDN-gateway 107, i.e. the IP peer corresponding to user equipment 103. As a consequence, the PDN-gateway (more generally a dedicated data unit processing entity of the core network) can perform appropriate data unit processing, such as e.g. routing of the IP data units towards the Internet.

SUMMARY

It is the object of the present invention to provide improvements for conveying data units in mobile communication systems that comprise an access network and core network.

This object is solved by the subject-matter of the independent claims. Advantageous embodiments are described in the dependent claims. In accordance with a basic concept of the invention, an access network entity for a mobile communication system that comprises an access network and a core network is arranged in such a way that it can be controlled to associate a radio channel (such as e.g. an LTE radio bearer) between the access network entity and a radio terminal with one of a channel to a dedicated data unit processing entity in the core network (e.g. a PDN-GW) for conveying data units from the radio terminal to the dedicated data processing entity for processing, and an access network channel for conveying data units from the radio terminal within the access network.

As a consequence, in accordance with the invention an access network entity 100 such as a base station is capable of associating a radio channel between a radio terminal (such as radio terminal 103) and the base station 100 either with a channel towards a dedicated data unit processing entity of the core network, such as for example gateway 107 via channels 112/113, or of associating the radio channel 108 with an access network channel, such as e.g. a radio channel 109 to a further radio terminal 104, without having to establish an association towards the core network element 107. In other words, the access network entity 100 obtains the capability of possibly associating channels within the access network in such a way that data units from a radio terminal can be conveyed within the access network and thus without having to first convey the data units to the dedicated data unit processing entity in the core network. On the other hand, the capability of conveying data units to the dedicated data processing entity is retained, such that under certain conditions data units may be conveyed within the access network, and under other conditions data units may be conveyed in the conventional way to the dedicated data unit processing entity in the core network for processing.

The benefit of this concept lies in the fact that it is no longer necessary to convey all data units (e.g. IP packets or packets of another network protocol) to the dedicated data unit processing entity, which can greatly reduce the load on the connection between the access network and the core network. In other words, in the event that the intended destination of a data unit communication is within the same access network as the originating radio terminal (e.g. radio terminal 103 would like to send data units to radio terminal 104 or radio terminal 105), then an efficient "local conveying" mechanism within the access network can be used, without having to use further network resources and thus conveying data units to the core network (more specifically to entity 107), only to then have to convey the same data units back again to the same access network. Thus, the transport network between the access network and core network can be relieved, which provides advantages in terms of transportation efficiency, which in turn leads to advantages in the dimensioning the transport network (lower capital expenditure or CAPEX), and during the operation the power consumption, which depends on the load, can be reduced (lower operating expenditure or OPEX). As a further advantage, a possibility of locally conveying data units within the access network but without having to convey the data units to the core network leads to a reduction of data unit delay, which is an important aspect for quality of service. For example, gaming applications and some other applications require very low delays.

BRIEF DESCRIPTION OF FIGURES

In the following reference will be made to a number of detailed examples which will be described in connection with the attached Figures, in which.

DETAILED DESCRIPTION

In the following, reference will often be made to a communication system comprising and LTE access network and an evolved packet core (EPC) as a core network. Such systems are a preferred field of application of the present invention, but it is noted that the invention is by no means limited thereto and can be applied in the context of any mobile communication system comprising an access network and a core network, and designed for conveying data units.

Figure 2:
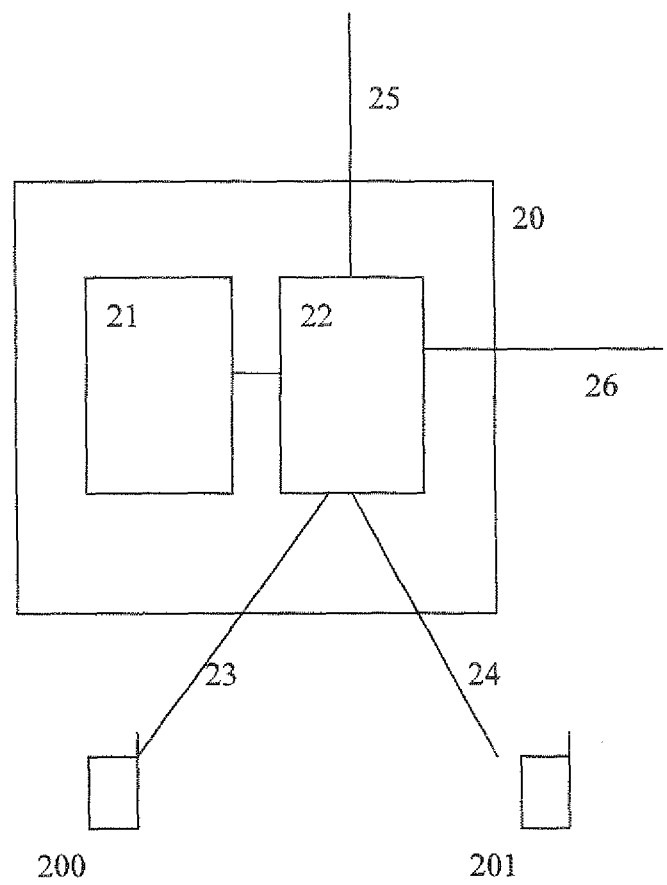
FIG. 2 is a schematic block diagram showing an example of an access network entity according to an embodiment of the invention.

FIG. 2 shows a schematic example of an access network entity arranged in accordance with the present invention. It is noted that the term entity is used generically for a device or a group of devices that provide a given functionality. As such, an entity can be a physical unit or can be spread over several units. The schematic representation of FIG. 2 only shows elements that are significant for describing the invention, and further known elements of an access network entity (e.g. of an access network node such as a base station) will not be described, as they are well known. In FIG. 2, the access network entity 20 comprises a controller 21, e.g. a programmable processor of known kind, and reference numeral 22 relates to a communication section for performing communications over connections 23, 24, 25 and 26 to other entities, such as radio terminals 200 and 201, other access network entities (not shown) or core network entities (not shown). Access network entity 20 is arranged such that controller 21 may associate a radio channel, such as channel 23 or 24 between the access network entity 20 and a radio terminal (such as terminal 200 or 201) with one of a channel 25 to a dedicated data unit processing entity in the core network, for conveying data units from the radio terminal to the dedicated data unit processing entity for processing, and an access network channel (such as radio channel 24 or channel 26 towards a further access network entity) for conveying data units from the radio terminal within the access network. This local conveying of data units within the access network may also be referred to as a "local re-routing", as data units are not routed by the dedicated data unit processing entity in the core network.

The associating of radio channels can be done in any suitable or desirable way. For example, this can be achieved by mapping channel identifiers appropriately onto one another. Examples of channel identifiers are radio bearer IDs, tunnel end-point IDs (TEIDs), etc. The channels will be established and maintained in accordance with the applicable rules and standards of the mobile communication network to which the concept of the present invention is applied, and can thus e.g. be bearers in accordance with 3GPP standards.

Figure 3:
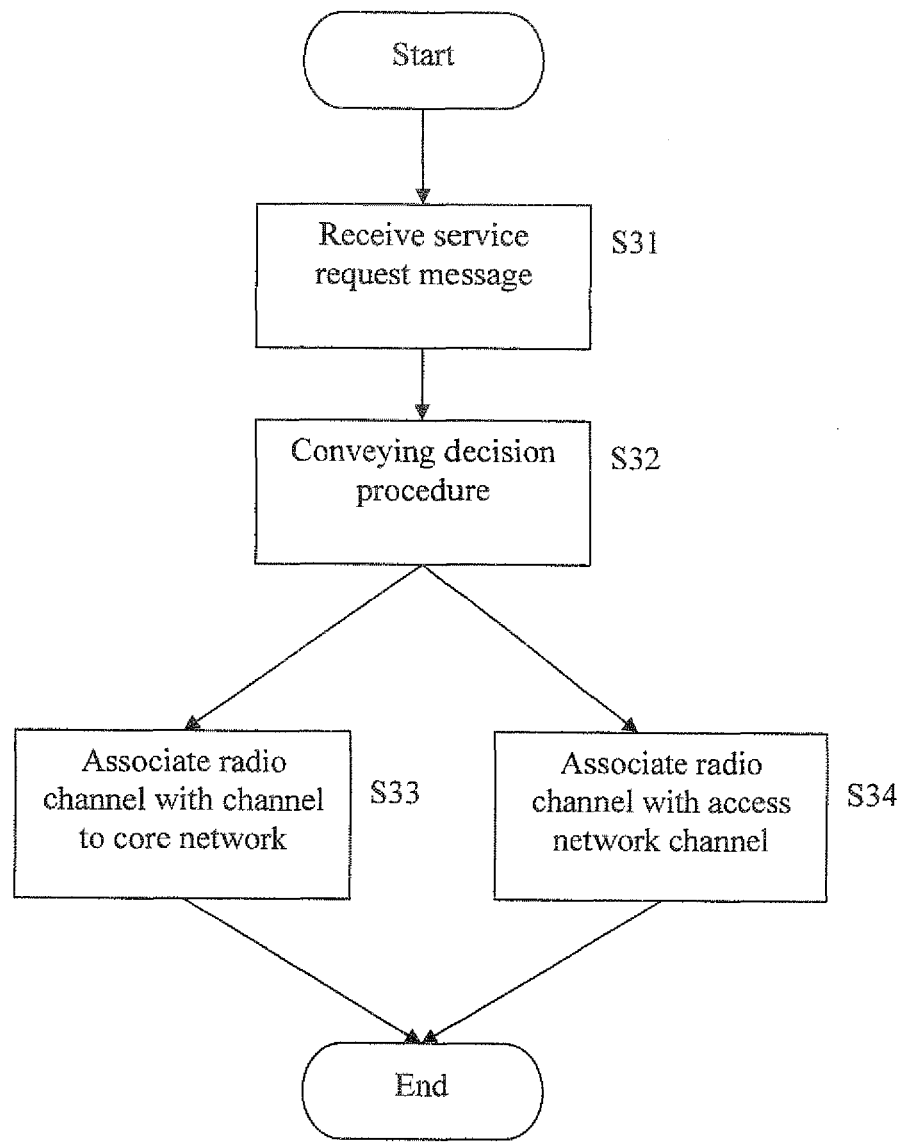
FIG. 3 is a flowchart showing a method embodiment of the present invention.

FIG. 3 shows a basic method embodiment of the present invention. As can be seen, in a first step S31 a service request message for data unit communication is received from a radio terminal. Thus, e.g. access network entity 20 of FIG. 2 receives such a service request message from radio terminal 200, or access network entity 100 of FIG. 1 receives such a service request message from radio terminal 103. Then, in step S32 a conveying decision procedure is performed. This conveying decision procedure may be performed within the access network entity, such as network entity 20 of FIG. 2, it may be performed both within the access network entity and a further separate entity, or it may be performed completely outside of the access network entity 20 in a separate entity such as e.g. the control entity 102 shown in FIG. 1. Depending on the outcome of the conveying decision procedure, the radio channel between the access network entity and the radio terminal (such as channel 23 in FIG. 2 or channel 108 in FIG. 1) is associated either with a channel (such as channel in FIG. 2 or channel 112/113 in FIG. 1) to a dedicated data unit processing entity (such as a P-GW) 107 in the core network for conveying data units from the radio terminal (103; 200) to the dedicated data unit processing entity for processing, or an access network channel for conveying data units from the radio terminal within the access network.

Figure 1:
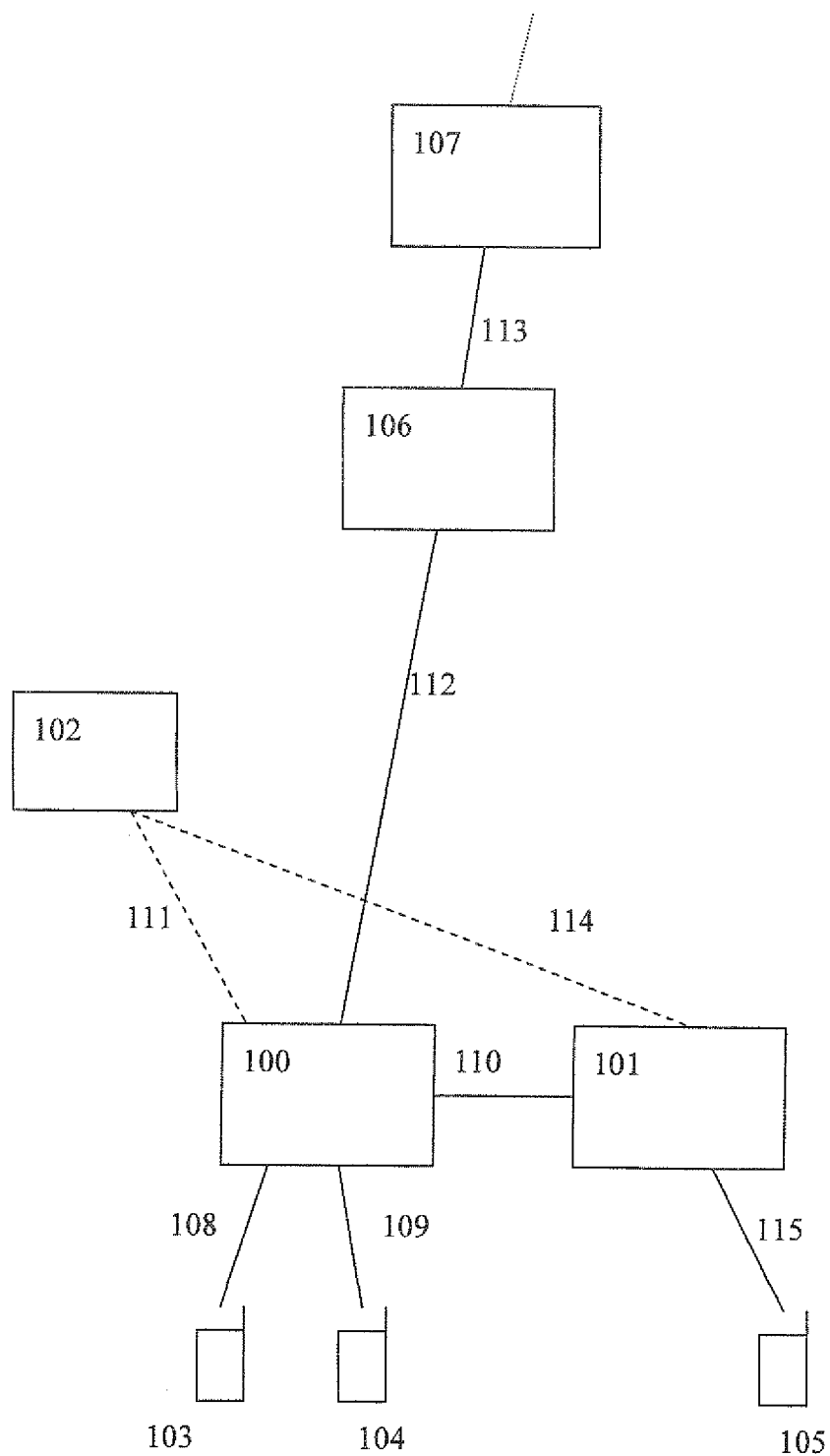
FIG. 1 is a schematic block diagram of a mobile communication system to which the concepts of the present invention can be applied.

The access network entity 100 of FIG. 1 or 20 of FIG. 2 to which the concept of the present invention can be applied, can be a base station of the access network (such as an eNodeB), or some other node involved in radio communication with radio stations, such as a relay node of the access network. Preferably it is a node that terminates the highest radio specific protocol, such as the Radio Link Control (RLC) protocol or the Packet Data Convergence Protocol (PDCP).

The access network channel that can be associated with the radio channel can be selected from a number of different channels within the access network. For example, the radio channel in question, such as radio channel 108 in FIG. 1, can be a first radio channel and consequently the radio terminal in question, such as radio terminal 103 in FIG. 1, can be a first radio terminal, and the access network channel to be associated with the first radio channel 108 can be a second radio channel between the access entity 100 and a second radio terminal, such as radio channel 109 to radio terminal 104 in FIG. 1. In this way, the access network entity 100 has the capability of directly associating the first radio channel 108 with the second radio channel 109, to thereby convey data units (such as IP packets) directly from the first terminal 103 to the second terminal 104 without any intervention of further network entities, especially without intervention of core network entities like the gateways 106 and 107.

According to a another embodiment, where the access network comprises a plurality of access network entities, e.g. a base station 101 as shown in FIG. 1 in addition to access network entity 100, the access network channel to be associated with the radio channel (e.g. radio channel 108) can be a channel between the access network entity and the further base station, such as channel 110 between access network entity 100 and base station 101, in order to be able to convey data units from the originating radio terminal 103 to a radio terminal connected to base station 101, such as radio terminal 105. Again, the same advantages as before can be achieved, namely that it is not necessary to convey data units to an entity in the core network, thereby providing an efficient conveying of data units with low delay.

Figure 4:
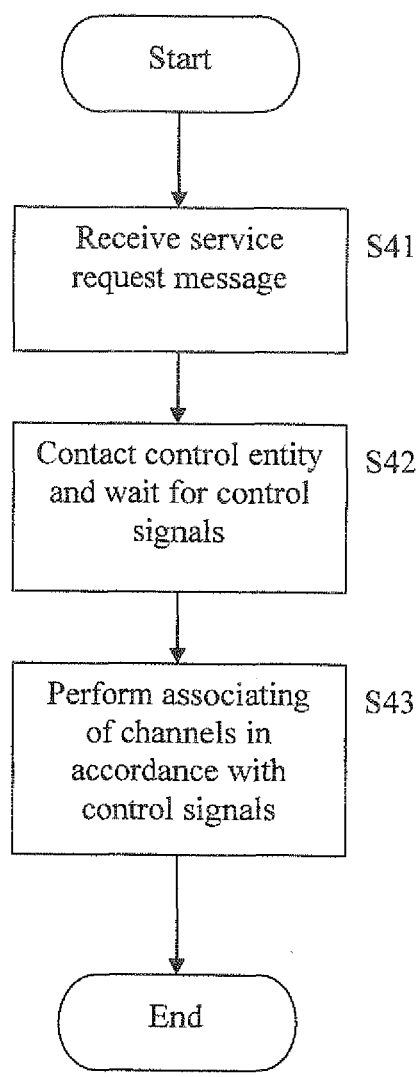
FIG. 4 is a flowchart showing a further method embodiment of the present invention.

As already mentioned previously, the conveying decision procedure (S32) in FIG. 3 can be performed within the access network entity or in a separate entity. FIG. 4 shows a flow chart of a method embodiment, in which the conveying decision procedure is performed in a separate control entity, such as the control entity 102 shown in FIG. 1 (for example a Mobility Management Entity (MME) known from LTE and EPC). In this method of FIG. 4, the access network entity 20 first receives a service request message in step 541, and then contacts the control entity 102 in step 842, and waits for appropriate control signals indicating the result of the conveying decision procedure. Then, after having received the control signals, an associating is performed in accordance with the control signals, see step 843. In other words, in this case the control entity makes the decision and then sends instructions to the access network entity (e.g. the base station), which in turn performs the associating of operation, i.e. appropriately concatenates the radio channel from the requesting radio terminal with an access network channel of the access network, or with the channel to the dedicated data unit processing entity, depending on the decision made by the control entity 102.

The conveying decision procedure performed by the access network entity or by the control entity can be arranged in any suitable or desirable way. For example, it can be such that it comprises determining whether the service request received from the radio terminal comprises a request for establishing a local connection within the access network for conveying data units. In other words, in this case, the service of using an access network channel to thereby provide local conveying of data units within the access network is a service known to the radio terminals, which can explicitly request this special service. Thus, the conveying decision procedure can also be such that if the explicit request for this service is not comprised within the service request message, then a conventional associating is performed, i.e. the radio channel is associated with the channel to the dedicated data unit processing entity in the core network as this is conventionally done today for all radio channels.

However, the conveying decision procedure and hence the possibility of conveying data units locally in the access network can also be transparent to the radio stations, such that these do not explicitly request such a service. In this case the conveying decision procedure may depend on other criteria, such as eligibility of the involved radio terminals, network efficiency criteria, etc.

Preferably, the conveying decision procedure furthermore comprises examining eligibility for local data unit conveyance of one or both of the radio terminal sending the service request message and the destination radio terminal identified in the service request message. In other words, the conveying decision procedure is capable of analysing whether the originating radio terminal has proper authorization to request such a local data unit conveying within the access network (e.g. on account of a corresponding subscription), and/or the conveying decision procedure can determine whether the destination radio terminal is suitable for such a local data unit conveying e.g. on account of its authorization, and/or on account of its location. More specifically, it is understandable that a local conveying of data units of a given destination radio terminal is only reasonable if that destination radio terminal is within reach of the access network. If the conveying decision procedure determines that one or both of the requesting radio terminal and the destination radio terminal are not eligible for local data unit conveying within the access network, then the decision is to associate the radio channel of the requesting radio terminal with the channel to the dedicated data unit processing entity in the core network, for conveying the data units there, as this is conventionally done today for all radio channels.

The conveying decision procedure may generally comprise one or more of an authorization determination (e.g. is a particular radio terminal or user equipment allowed to request that service?), an admission control operation (e.g.

are there enough resources available at the access network entity to offer that service?), and a resource control operation (e.g. should a service quality other than best-effort be used? How many resources of a particular access network entity should be allocated to be used by said service?).

It is noted that in present day communication networks the dedicated data unit processing entity in the core network, such as a P-GW, can be used for charging operations and for enabling lawful interception. With respect to charging, the localized service for conveying data units within an access network as enabled by the present invention can be handled in a plurality of ways. In a simplest case, the service using local conveying of data units can be free of charge, i.e.

there is no charging operation implemented. However, it is equally possible to arrange the conveying decision procedure in such a way that it comprises a charging trigger operation, i.e. the entity handling the conveying decision procedure has a direct logical connection to a network charging system (such as an Online Charging System (OCS)), or a logical signalling connection can be established to one of the core network gateways 106 or 107 (but without any data unit transmission on the user plane), to thereby establish an indirect connection to a charging system of the communication network. Furthermore, it is envisionable to arrange the access network entity to perform a traffic load measurement for the amount of data being conveyed through the access network with the localized service, where corresponding reports could be sent to the network charging system directly or via the control entity 102 or the gateways 106, 107.

In order to provide for the possibility of lawful interception, the conveying decision procedure may be arranged to comprise an examination of a lawful interception condition.

For example, such a condition can be the examination of the identifiers of an originating radio terminal and/or a destination radio terminal, which identifications may be provided in a lawful interception list, and if the identity is present on the lawful interception list, then the result of the conveying decision procedure is that the radio channel may not be associated with the access network channel for local conveying of data units, and that rather the access network entity is forced to associate the radio channel with the conventional channel to the dedicated data unit processing entity, such as the P-GW, such that a lawful interception procedure can be conducted at the dedicated data processing entity in the core network in a known way. As an alternative, it is however also possible to provide one or both of the access network entity 100 and the control entity 102 with known lawful interception capabilities as these are presently implemented in the dedicated data unit processing entity 107 of the core network.

It is noted that the access network entity of the present invention and the corresponding control method are preferably also capable of performing a hand-over procedure for handing over the access network channel initially associated with the radio channel between the access network entity and the radio terminal, to another channel, depending on one or more predetermined conditions. For example, if it is assumed in FIG. 1 that initially the radio channel 108 between network entity 100 and radio terminal 103 is associated with the radio channel 109 between access network entity 100 and radio terminal 104, and then radio terminal 104 moves out of range of access network entity 100 and e.g. into range of base station 101, then is it preferable that a procedure is in place for handing over the association of channel 108 and 109 in such a way that channel 108 can be associated with a channel towards base station 101, i.e. channel 110 shown in FIG. 1, in order to continue the local conveying of data units between radio terminals 103 and 104

Equally, it is preferable that a hand-over is possible from radio channel 108 to the channel 112/113 towards the dedicated data unit processing entity 107, e.g. in the event that radio terminal 104 moves out of range of the access network comprising entities 100 and 101.

As an alternative to providing for a hand-over procedure under predetermined conditions, it is also possible to arrange the conveying decision procedure in such a way that it comprises examining whether the source and/or destination radio terminal fulfils an immobility condition, and enabling the association of the radio channel of the access network entity and the radio terminal with the access network channel only if the immobility condition is fulfilled. The immobility condition can be chosen in any suitable or desirable way, e.g. the control entity 102, which is preferably arranged for mobility management, can maintain a record of movement for radio terminals in communication with the access network, and can thus decide whether a radio terminal is to be considered as immobile or not. It is noted that the term "immobile" indicates that the radio terminal is not moving. This can be due to a momentary situation, i.e. the radio station is capable of movement but presently not moving, or can be due to a permanent arrangement, i.e. the radio terminal is fixed to a given location.

Figure 5:
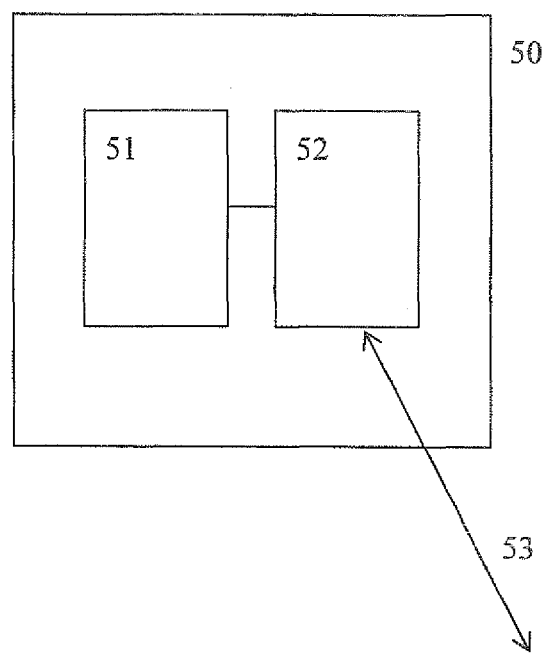
FIG. 5 is a schematic block diagram of a control entity arranged in accordance with an embodiment of the present invention.

FIG. 5 shown a further embodiment of the invention, namely a control entity 50 (which is e.g. identical to the control entity 102 shown in FIG. 1) for a mobile communication system that comprises an access network and a core network, where the control entity 50 has a controller 51 and a communication section 52, and the controller 51 is arranged for performing a conveying decision procedure for generating control signals 53 to an access network entity (such as network entity 100 in FIG. 1) for letting the access network entity perform an associating of a radio channel between the access network entity and a radio terminal with one of a channel to a dedicated data unit processing entity in the core network for conveying data units from the radio terminal to the dedicated data unit processing entity for processing, and an access network for conveying data units from the radio terminal within the access network.

Figure 6:
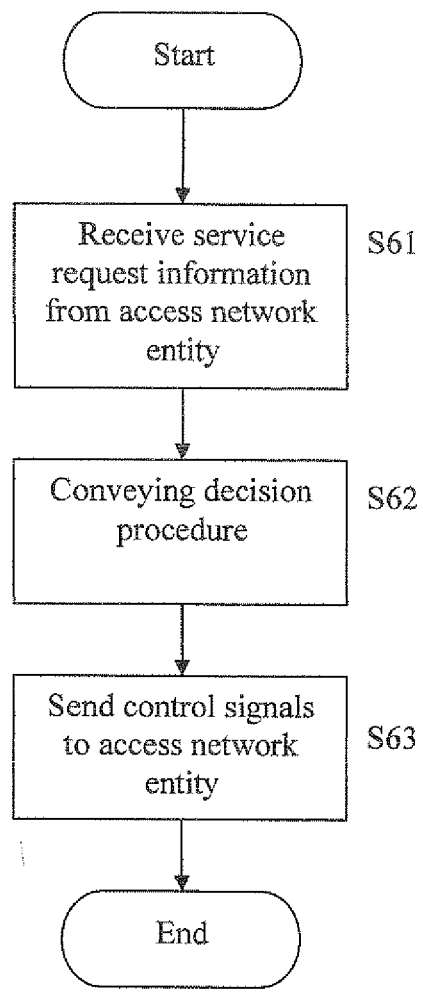
FIG. 6 is a flowchart of a further method embodiment of the present invention.
Figure 7:
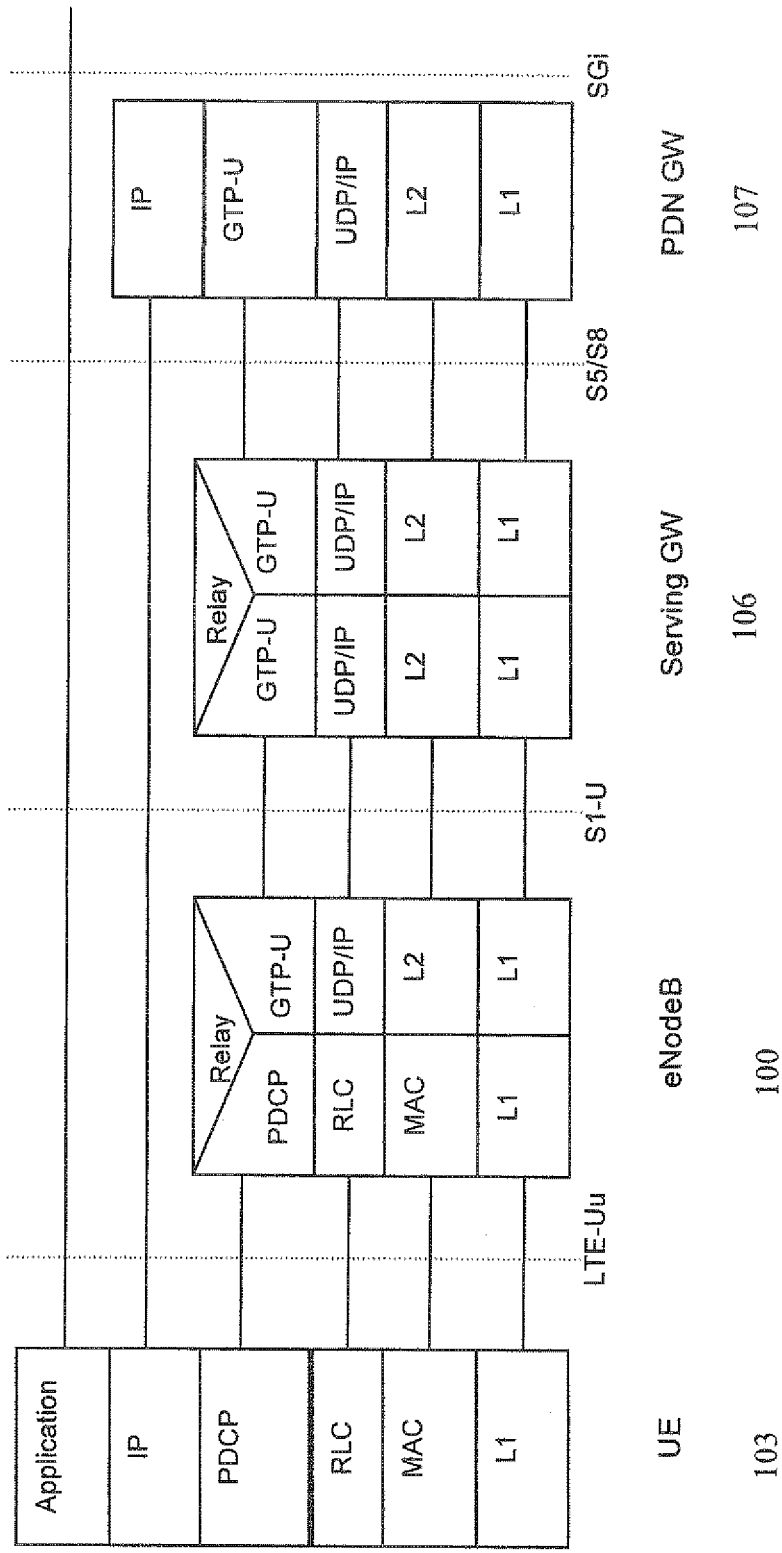
FIG. 7 is a schematic representation of a protocol hierarchy in a conventional communication between user equipment and a dedicated data unit processing entity in a core network.

A corresponding method for controlling the control entity 50 of FIG. 5 is shown in FIG. 6, which comprises a step S61 for receiving a service request information from the access network entity, a step S62 for performing the conveying decision procedure, and a step S63 for generating and sending control signals to the access network entity such that the access network entity can perform the associating of the radio channel between the access network entity and a radio terminal with the channel to the dedicated data unit processing entity or the access network channel.

It is noted that the previously described embodiments can be implemented as hardware, software or any suitable combination of hardware and software. The present invention can therefore also be embodied in the form of a computer program or computer program product comprising a computer program that has code parts for performing one of the previously described methods when loaded into and executed on a programmable entity of the communication network, such as the access network entity or the control entity that is usually part of the core network.

In the following, specific embodiments in the context of an access network according to long term evolution (LTE) and an evolved packet core (EPC) will be described. These are to be seen as a preferred application of concepts of the invention, but are not intended to be in any way limiting.

Figure 8:
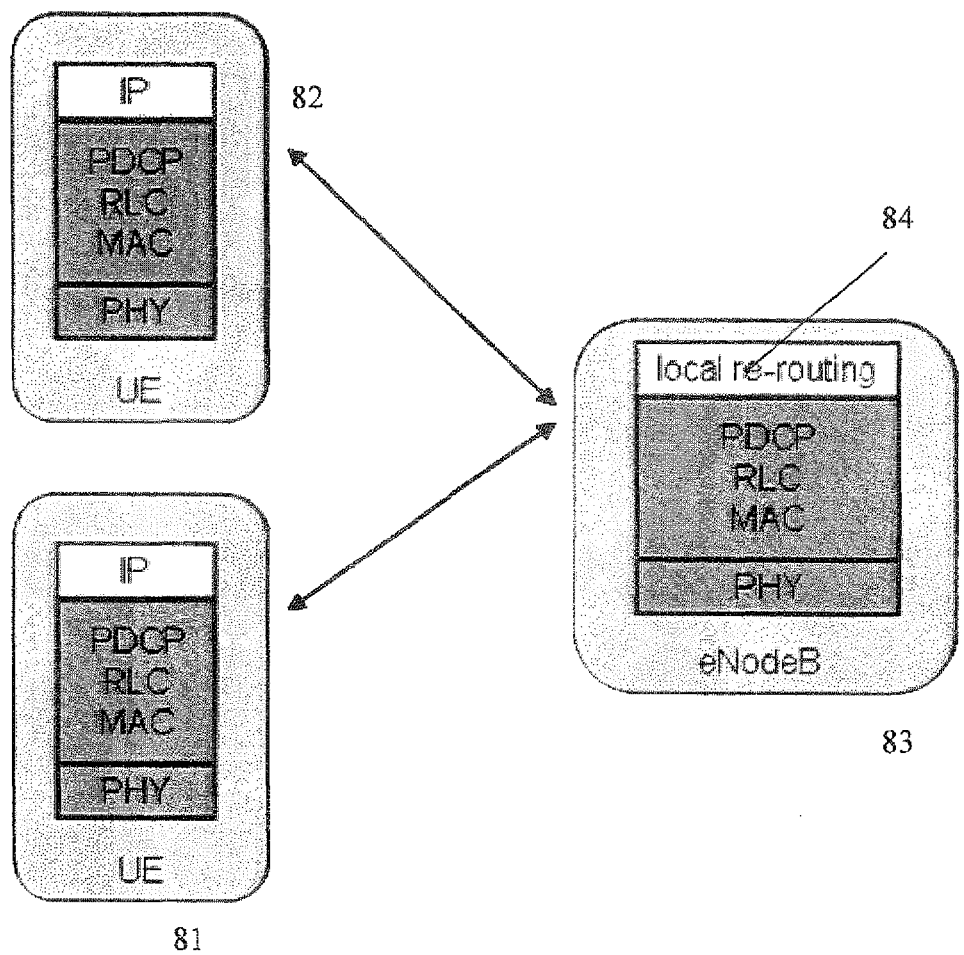
FIG. 8 is a schematic representation of two radio terminals engaged in a local data unit conveying session via an access network entity arranged according to the present invention.

FIG. 8 shows an example of a user plane protocol stack of two UEs 81 and 82 and an eNodeB 83 capable of conveying local peer-to-peer user data. The eNodeB 83 processes the user data up to the PDCP protocol, which is the last, i.e., highest up in the protocol stack, radio specific protocol in LTE. Local peer-to-peer user data is then re-routed downwards and re-processed by the PDCP layer, using the new local re-routing functionality 84 implemented above the PDCP layer.

The proposed concept allows disassembling the EPS bearer composed of the radio bearer and access bearer. Instead, two radio bearers may be associated, i.e. connected to each other. This connection is done during radio bearer establishment, which is controlled by the MME. This results in different establishment/control/tear down procedures for regular EPS bearer and local peer-to-peer bearer, as will e.g. be explained in connection with the example of FIG. 12.

A GTP tunnel towards the core network is not needed and not established. Due to the connection of both radio bearers, packets from one radio bearer are automatically forwarded to the corresponding radio bearer and vice versa. A radio bearer may e.g. be identified by the radio bearer ID. In practice the radio bearer can be identified by the logical channel identity (MAC), the RLC or the corresponding PDCP instance.

In general, LTE radio bearers are bi-directional. So the establishment of two radio bearers for local peer-to-peer communication may generally result in a bi-directional connection. Of course only one of two directions might be used, e.g., for uni-directional data transmission. Then, the unused direction of the radio bearers could be configured not to consume/reserve any resources (best effort).

The destination address of a local peer-to-peer data transfer could be a multicast (or even broadcast) address. Then, IP packets can e.g. be sent to many (all) UEs in a cell.

Figure 9:
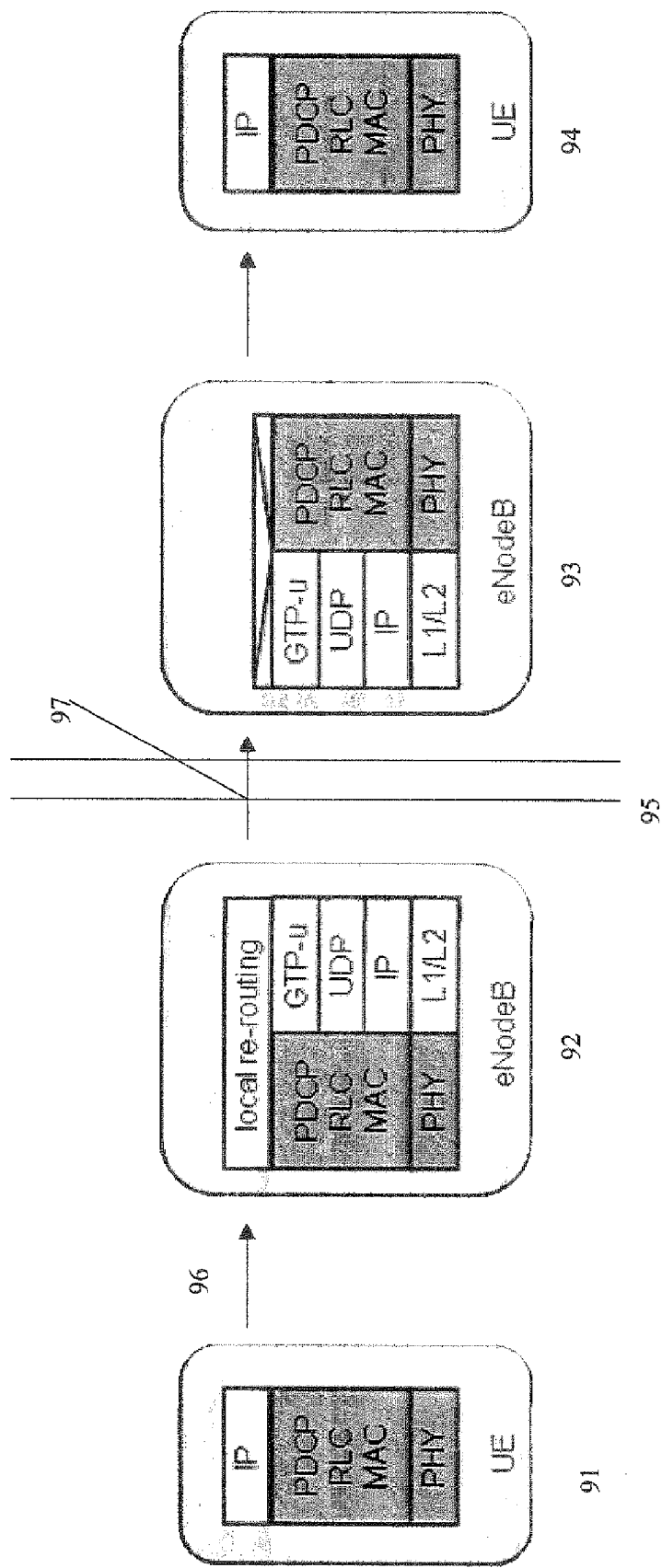
FIG. 9 is a schematic representation of local data unit conveying via an access network channel involving two base stations.

Local conveying can take place with UEs of the same cell or with UEs of different cells of the same eNodeB (via the server backplane). Another embodiment of the concept allows re-routing packets of UEs located in cells of neighboring base stations. There re-routing may take place via the inter-eNodeB interface X2 (GTP-u tunnel between eNodeBs), see FIG. 9. More specifically, FIG. 9 shows a first LIE 91, a first eNodeB 92, a second eNodeB 93 and a second UE 94, where reference 95 indicates the X2 interface between the two eNodeBs. In this example, eNodeB 92 is capable of associating radio channel 96 with access network channel 97 for performing local data unit conveying within the access network, i.e. for conveying data units from UE 91 to UE 94 without the intervention of the core network.

Figure 10:
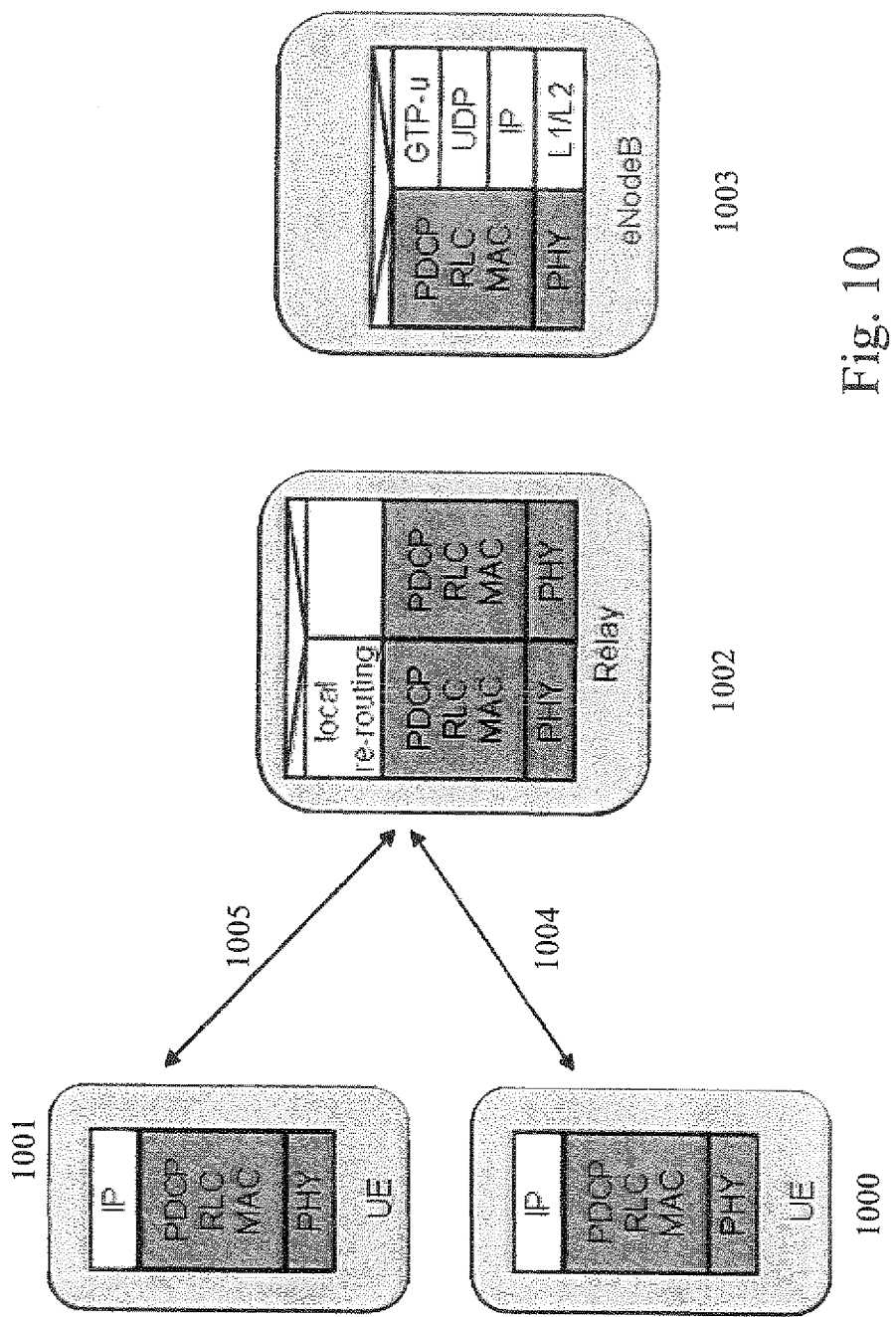
FIG. 10 is a schematic example of a further embodiment of the invention, in which a relay node of an access network associates two radio channels for local conveying of data units from one radio terminal to another.

The same principle of re-routing local peer-to-peer data at the eNodeB can also be adapted to multihop networks, where local peer-to-peer data could be re-routed at the first relay node. A corresponding user plane protocol stack involving two UEs 1000 and 1001 as well as a relay node 1002 and an eNodeB 1003 is shown in FIG. 10. Note that, in order to perform re-routing by associating radio channels 1004 and 1005, radio protocols (MAC, RLC, PDCP) should terminate in the relay node 1002. The establishment, maintenance and tear down of the re-routing function at the relay node 1002 could be configured by the MME or by the eNodeB 1003, depending which node is actually controlling the relay node 1002.

Figure 11:
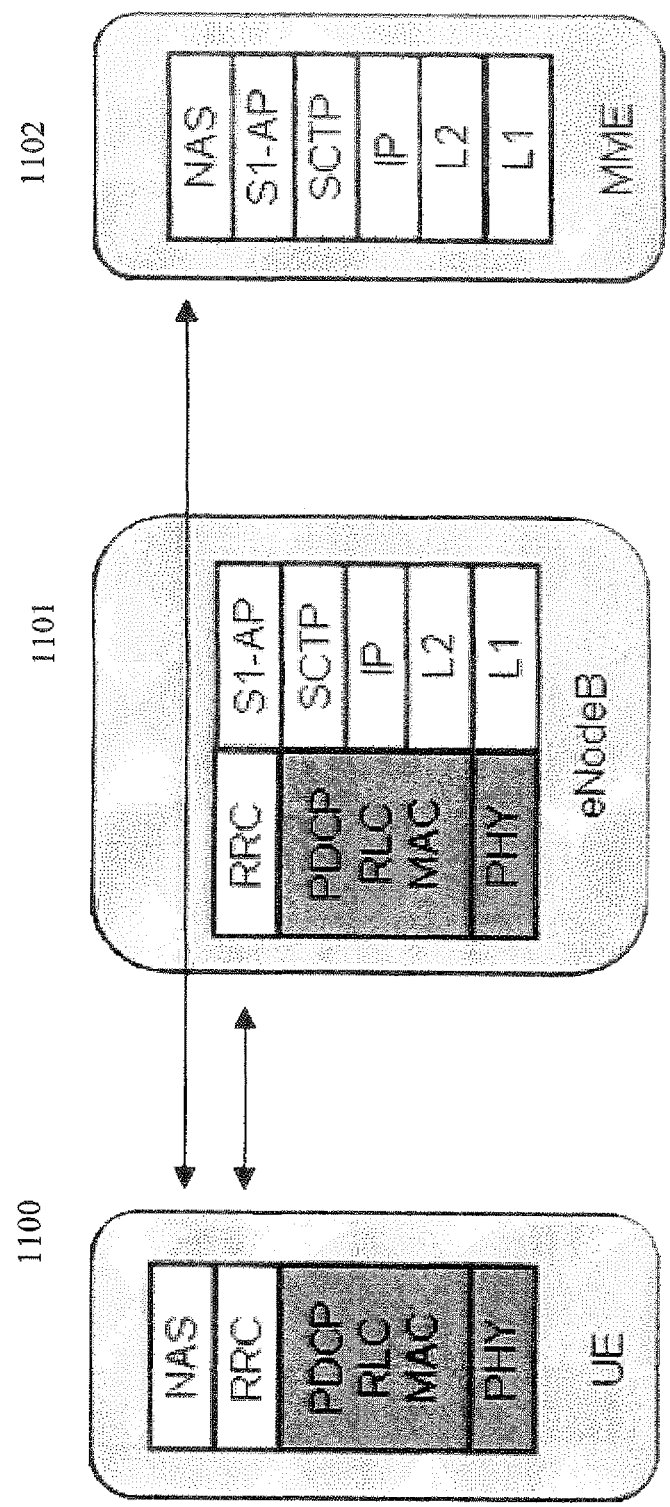
FIG. 11 shows a schematic example of a control plane communication between a user equipment and a control entity.

FIG. 11 shows an example of a control plane protocol stack, which spans from the UE 1100 across the eNodeB (i.e. an implementation of the Radio Resource Control (RRC) protocol) and to the MME (i.e. an implementation of the Non-Access Stratum (NAS) protocol) is not affected by the local re-routing of user data. The MME 1102 may still handle core network control functions, such as attach/detach handling, mobility functions, bearer management, and security. And it still terminates the NAS signalling protocols, like in known systems.

Although the form of the stack does not change compared to present systems, the protocol implementation is different when applying the concept of the invention. Instead of establishing an EPS bearer, which is composed of a radio bearer and the corresponding GTP tunnel to the core network, the "connection establishment" function of the MME (part of S1-AP) would establish two radio bearers which are mapped to each other.

If a handover functionality is implemented, the involved eNodeBs (or generally access network entities) may negotiate and execute the handover. MME or S-GW are not involved. Once the radio bearer at the target eNodeB has been established, the target eNodeB request from the MME (by means of S1-AP signalling) to switch the GTP-tunnel from the source to the new target eNodeB.

If the source eNodeB has maintained a local peer-to-peer connection, the MME tears down the local peer-to-peer radio bearer of the UE that has left the cell. Then the MME establishes a new GTP tunnel and connects that GTP-tunnel to the newly established radio bearer at the target eNodeB. Simultaneously, the MME establishes another GTP tunnel and connects that GTP-tunnel to the radio bearer of the UE that is left at the source eNodeB.

If local re-routing is possible at the target eNodeB (after the handover), the MME does not create a new GTP-tunnel for the target eNodeB but it maps the two radio bearers to establish a local peer-to-peer connection. The GTP-tunnel of the other UE can be released as well.

Beside the modified path switch commands, the mobility procedures from LTE can be reused.

As already mentioned before, an alternative embodiment of the invention could be to restrict the service to immobile UEs. If the signal strength of a UE performing local peer-to-peer communication goes down, the MME switches back to the regular (conventional) communication where user data is routed via the S-GW. In that case a handover functionality can be omitted.

Figure 12:
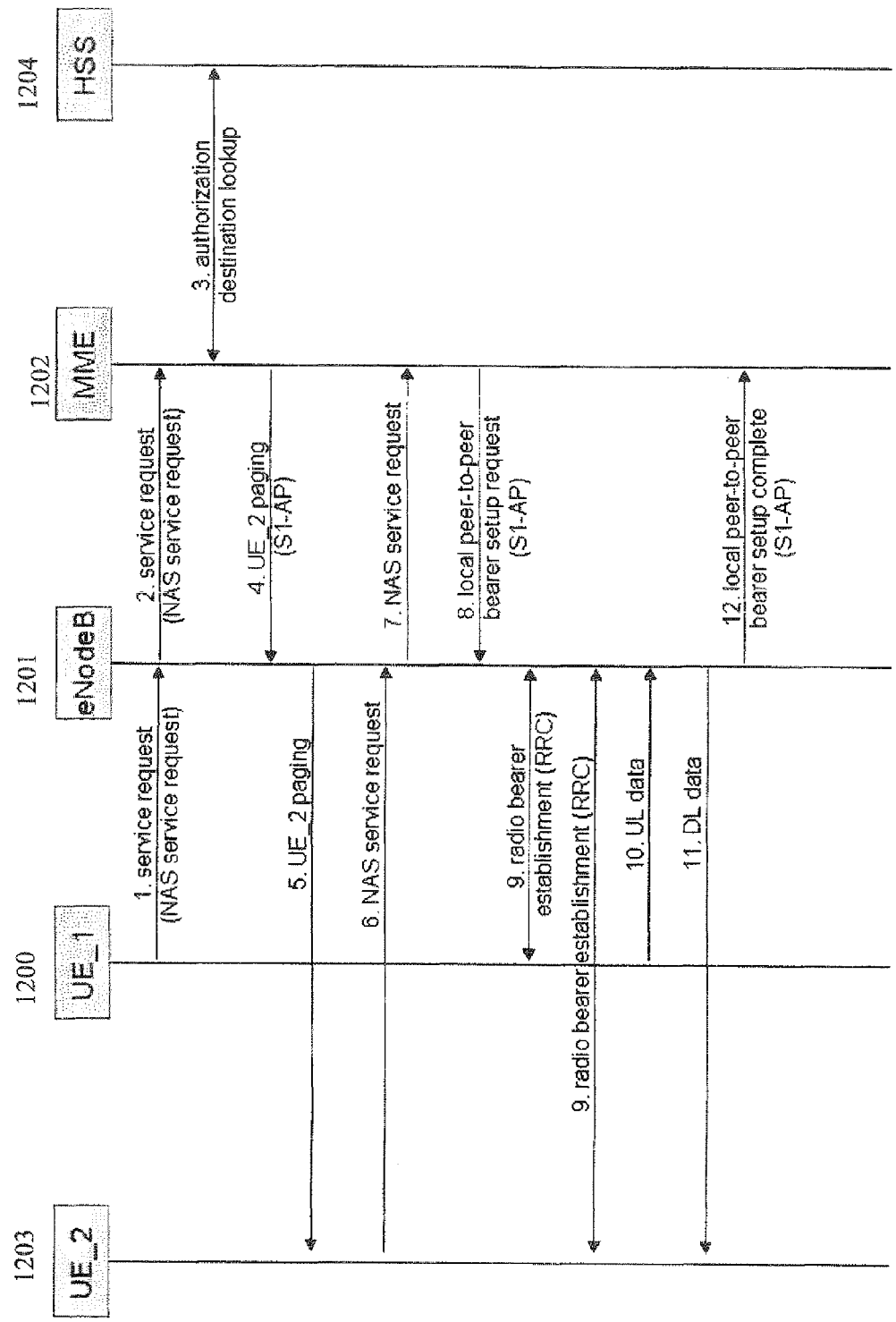
FIG. 12 shows an example of signalling messages in an embodiment of the present invention.

An example procedure to request a local peer-to-peer service is shown in FIG. 12. The procedure may be composed of the following steps:

1. The UE 1200 sends an NAS message with the service request encapsulated in an RRC message to the eNodeB 1201. The service request could be an explicit service request for a local peer-to-peer service or a request for a regular service which is later on re-configured as a local peer-to-peer service transparently to the user, as indicated previously.
2. The eNodeB 1201 forwards NAS message to MME 1202. The NAS message is encapsulated in an S1-AP.
3. Authentication procedures can be performed. Here the MME 1202 could check if both peer UEs 1200 and 1203 are registered by the same HSS (Home Subscriber Server) 1204 and if both peers are allowed to use the local peer-to-peer service. The HSS typically holds subscription and location information on the UEs.
4. If the destination UE 1203 is registered in the MME 1202, the MME sends a NAS paging message to each eNodeB belonging to the tracking area(s) in which the UE 1203 is registered. Steps 3-4 are omitted if the MME 1202 already has a signalling connection over S1-MME towards the UE 1203.
5. The UE 1203 is paged by the eNodeBs, e.g. enodeB 1201 in the example.
6./7. Upon reception of paging indication, the UE 1203 initiates the UE triggered service request procedure already described in connection with steps 1 and 2.

The MME 1202 supervises the paging procedure. If the MME 1202 receives no response from the UE 1203, it may repeat the paging. If the MME 1202 receives no response from the destination BE 1203 after the paging repetition procedure, it can reject the service request received in step 2 (instead of setting up the radio bearer in step 8).

8. The MME 1202 sends the bearer setup request (S1-AP signalling) message to the eNodeB 1201.
9. The eNodeB 1201 performs the radio bearer establishment procedure (RRC signalling) with both UEs 1200 and 1203 involved. In the eNodeB 1201 both radio bearers are mapped onto each other (no S1 access bearer is involved).
10./11. The uplink data from the UE 1200 can now be forwarded by eNodeB 1201 to the local peer BE 1203. The eNodeB 1201 sends the uplink data to the DL radio bearer with the corresponding radio bearer ID.
12. The eNodeB 1201 sends a setup complete (S1-AP) message to the MME 1202. This message might be transmitted as setup response message before the reception of UL data in step 10.

The modification of an existing local service (MME or BE initiated), the re-configuration of a regular bearer to a local peer-to-peer bearer (MME initiated), and deactivation of local peer-to-peer bearer (MME or BE initiated) are performed accordingly. That means that the regular LTE procedures are used without involvement of the S/P-GW. As already mentioned, re-routing of local peer-to-peer data could be done transparent to the user. In this case the UE requests a regular connection, i.e. assumes that a bearer towards the P-GW in the core network is established. However, according to the invention, the MME is in charge to either establish a regular EPS bearer in case of regular traffic or to establish a local peer-to-peer bearer in case of local peer-to-peer data exchange. Location information about UEs is already available at the MME. By means of local re-routing the MME minimizes the network load (especially transport network and S/P-GW load) and packet delays in a way that would be transparent to the end user.

Alternatively, the UE may also explicitly request a local peer-to-peer radio bearer. Then, the MME will perform an eligibility examination and e.g. first check whether the addressed UE is in the vicinity of the requesting UE so that local re-routing is possible. If that is the case, the MME establishes the local peer-to-peer bearer. If local re-routing is not possible the MME rejects the connection request or it establishes a regular EPS bearer.

The entity controlling the connection establishment could be the MME or a separate node.

Local peer-to-peer communication can be seen as a feature transparent to the UE which minimizes transport network and S/P-GW load and which minimizes packet delay. The quality of such local peer-to-peer connections should be equal to the quality of regular connections. Thus, the same admission control and resource reservation schemes should be applied to local as to regular traffic. For instance guaranteed bit rate radio bearers should be used for voice communication, variable bit rate radio bearers for premium data exchange and best effort radio bearers should be allocated to best effort services.

Alternatively, local peer-to-peer communication can be seen as a feature (or service) which can be explicitly requested by UEs to allow local communication (e.g. at lower cost). In that case, the resource usage of local peer-to-peer radio bearers should preferably be controlled. The controlling entity could be the MME or a separate node. That node would do authorization (Is a particular UE allowed to request that service?), admission control (Are there enough resources available at the eNodeB to offer that service?) and resource control (Should a service quality other than best-effort be used for peer-to-peer traffic? How many resources of a particular eNodeB should be allocated to be used by that service in general?). The amount of resources used at an eNodeB for local peer-to-peer traffic can be configurable.

If resources for peer-to-peer traffic are not or no longer available, e.g. due to overload, handover, or eNodeB re-configuration, but resources for regular operation (i.e. conveying data units to the core network P-GW) are still available the peer-to-peer radio bearers could be re-configured to regular EPS bearers. This could be done with or without notifying the UE.

The presented general concepts allow for transparent network optimization. The constraints of the transport network between the access network and core network can be relaxed.

A non-transparent application of local peer-to-peer services is a form of local sharing of data. Nowadays short range communication techniques such as WLAN, Bluetooth, or Infrared are used to share data (photos, ringtones, machine-to-machine data, etc.) between nearby peers. Also low-latency gaming is often performed with local partners. By dedicating a certain amount of resources to that service, operators could offer such services without risking transport network overload or increasing CAPEX or OPEX. For the core network these local services are not very stressful. Besides peer-to-peer services, also local servers connected to an access network entity (e.g. eNodeB) could offer the same cost benefits for local content services inside areas of dense user aggregation like inside sports arenas, malls, etc. Local peer-to-peer communication services could in this mode also be offered at a lower price, getting users more interested in access network based communications, like LTE based communications.

Another non-transparent application is local voice communication. Nowadays in-house phone systems or walky-talkies are used to communicate over short distances. Again, such services can be offered without risking too much stress on the transport or core network.

The described concepts allow for local data unit conveying, i.e. peer-to--peer communication that minimizes transport and core network resource usage. This is particularly important since in many cases the transport network between access network and core network will be the bottleneck of future cellular systems.

Due to the limited utilization of resources the described method allows a cost-efficient offering of local peer-to-peer data exchange such as local sharing of user data or local voice calls.

Local re-routing reduces packet delay, which is beneficial for applications, such as (local) gaming or security alerts.

The invention claimed is:

1. An access network entity for a mobile communication system that comprises an access network and a core network, said access network entity comprising a controller circuit configured to:
   receive, from a first radio terminal, a service request message for data unit communication from said first radio terminal to a second radio terminal;
   perform a conveying decision procedure to determine a channel association for a radio channel between the access network entity and the first radio terminal within the access network;
   if an outcome of the conveying decision procedure affirms an option of using an access network channel, associate the radio channel between the access network entity and the first radio terminal with the access network channel for conveying data units from the first radio terminal within the access network to the second radio terminal served by the same access network without conveying the data units through the core network; and
   otherwise, associate the radio channel between the access network entity and the first radio terminal with a channel to a dedicated data unit processing entity in said core network for conveying data units from said radio terminal to said dedicated data unit processing entity for processing.

2. The access network entity according to claim 1, wherein said access network entity is comprised in one of a base station and a relay node of said access network.

3. The access network entity according to claim 1, wherein said radio channel comprises a first radio channel, and wherein said controller circuit is configured to select said access network channel as a second radio channel between said access network entity and the second radio terminal.

4. The access network entity according to claim 1, wherein said access network entity is comprised in a first base station of said access network and said second radio terminal is comprised in a second base station, and said controller circuit is configured to select said access network channel as a channel towards the second base station of said access network.

5. The access network entity according to claim 1, wherein said access network entity is further configured to perform a hand-over procedure for said access network channel.

6. The access network entity according to claim 1, wherein said access network entity is configured such that said controller circuit affirms the option of using the access network channel when the first radio terminal comprises an immobile radio terminal.

7. A non-transitory computer readable medium storing a computer program with code parts configured, when said computer program is loaded into and executed on a programmable access network entity, to:
- receive, from a first radio terminal, a service request message for data unit communication from said first radio terminal to a second radio terminal;
- perform a conveying decision procedure to determine a channel association for a radio channel between the access network entity and the first radio terminal within an access network;
- if an outcome of the conveying decision procedure affirms an option of using an access network channel, associate the radio channel between the access network entity and the first radio terminal with the access network channel for conveying data units from the first radio terminal within the access network to the second radio terminal served by the same access network without conveying the data units through the core network; and one of:
- otherwise, associate the radio channel between the access network entity and the first radio terminal with a channel to a dedicated data unit processing entity in said core network for conveying data units from said first radio terminal to said dedicated data unit processing entity for processing.

8. A method of conveying data unit traffic from a radio terminal in a mobile communication system that comprises an access network and a core network, the method comprising:
- receiving, from the radio terminal, a service request message for data unit communication from said radio terminal to another radio communication device; and
- performing a conveying decision procedure to determine a channel association for a radio channel between an access network entity in the access network and the radio terminal;
- if an outcome of the conveying decision procedure affirms an option of using an access network channel, associating the radio channel between the access network entity and the radio terminal with the access network channel for conveying data units from the radio terminal within the access network to said another radio communication device served by the same access network without conveying the data units through the core network;
- otherwise, associating the radio channel between the access network entity and the radio terminal with a channel to a dedicated data unit processing entity in said core network for conveying data units from said radio terminal to said dedicated data unit processing entity for processing.

9. The method of claim 8, wherein said conveying decision procedure determines whether said service request message comprises a request for establishing a local connection within said access network for conveying data units.

10. The method of claim 8, wherein said conveying decision procedure examines an eligibility for local data unit conveyance of said radio terminal sending said service request message and a destination radio terminal, comprising the another radio communication device, identified in said service request message.

11. The method of claim 8, wherein said conveying decision procedure comprises one or more of authorization determination, admission control, and resource control.

12. The method of claim 8, wherein said conveying decision procedure comprises a charging trigger operation.

13. The method of claim 8, wherein said conveying decision procedure comprises examination of a lawful interception condition.

14. The method of claim 8, wherein said radio channel comprises a first radio channel, said radio terminal comprises a first radio terminal, and said another communication device comprises a second radio terminal, and wherein said access network channel is selectable as a second radio channel between said access network entity and the second radio terminal.

15. The method of claim 8, wherein said access network entity is comprised in a first base station of said access network and said another communication device is comprised in a second base station, and wherein said access network channel is selectable as a channel towards the second base station of said access network.

16. The method of claim 8, further comprising performing a handover of said access network channel under one or more predetermined conditions.

17. The method of claim 8, wherein performing said conveying decision procedure comprises examining whether the radio terminal fulfills an immobility condition, and affirming the option of using the access network channel only if said immobility condition is fulfilled.

18. A control entity for a mobile communication system that comprises an access network and a core network, said control entity having a controller circuit configured to;
- receive, from a first radio terminal, a service request message for data unit communication from said first radio terminal to a second radio terminal;
- perform a conveying decision procedure to determine a channel association for a radio channel between an access network entity within the access network and the first radio terminal within the access network;
- if an outcome of the conveying decision procedure affirms an option of using an access network channel, generate control signals directing the access network entity to associate the radio channel between the access network entity and the first radio terminal with the access network channel for conveying data units from the first radio terminal within the access network to the second radio terminal served by the same access network without conveying the data units through the core network;
- otherwise, generate control signals directing the access network entity to associate the radio channel between the access network entity and the first radio terminal with a channel to a dedicated data unit processing entity in said core network for conveying data units from said first radio terminal to said dedicated data unit processing entity for processing; and
- send the control signals to the access network entity.

19. A method for controlling a control entity for a mobile communication system that comprises an access network and a core network, the method comprising:
- receiving, from a first radio terminal, a service request message for data unit communication from said first radio terminal to a second radio terminal;
- performing a conveying decision procedure to determine a channel association for a radio channel between an access network entity within the access network and the first radio terminal within the access network;

if an outcome of the conveying decision procedure affirms an option of using an access network channel, generating control signals directing the access network entity to associate the radio channel between the access network entity and the first radio terminal with the access network channel for conveying data units from the first radio terminal within the access network to a second radio terminal served by the same access network without conveying the data units through the core network;

otherwise, generating control signals directing the access network entity to associate the radio channel between the access network entity and the first radio terminal with a channel to a dedicated data unit processing entity in said core network for conveying data units from said first radio terminal to said dedicated data unit processing entity for processing; and sending the control signals to the access network entity.

20. A non-transitory computer readable medium storing a computer program with code parts configured, when said computer program is loaded into and executed on a programmable control entity, to:

receive, from a first radio terminal, a service request message for data unit communication from said first radio terminal to a second radio terminal;

perform a conveying decision procedure to determine a channel association for a radio channel between an access network entity within an access network and the first radio terminal within the access network;

if an outcome of the conveying decision procedure affirms an option of using an access network channel, generate control signals directing the access network entity to associate the radio channel between the access network entity and the first radio terminal with the access network channel for conveying data units from the first radio terminal within the access network to the second radio terminal served by the same access network without conveying the data units through the core network;

otherwise, generate control signals directing the access network entity to associate the radio channel between the access network entity and the first radio terminal with a channel to a dedicated data unit processing entity in said core network for conveying data units from said first radio terminal to said dedicated data unit processing entity for processing.

\* \* \* \* \*

UNITED STATES PATENT AND TRADEMARK OFFICE
CERTIFICATE OF CORRECTION

Page 1 of 1

PATENT NO. : 8,837,395 B2
APPLICATION NO. : 13/140691
DATED : September 16, 2014
INVENTOR(S) : Sories et al.

It is certified that error appears in the above-identified patent and that said Letters Patent is hereby corrected as shown below:

On the Title Page, in Item (75), under "Inventors", in Column 1, Line 1, delete "(SE);" and insert -- (DE); --, therefor.

IN THE SPECIFICATION

In Column 5, Line 37, delete "step 541," and insert -- step S41, --, therefor.

In Column 5, Line 38, delete "step 842," and insert -- step S42, --, therefor.

In Column 5, Line 42, delete "step 843." and insert -- step S43. --, therefor.

In Column 7, Line 36, delete "104" and insert -- 104. --, therefor.

In Column 9, Line 10, delete "first LIE" and insert -- first UE --, therefor.

In Column 10, Line 44, delete "BE" and insert -- UE --, therefor.

In Column 10, Line 54, delete "BE" and insert -- UE --, therefor.

In Column 10, Line 61, delete "BE" and insert -- UE --, therefor.

In Column 10, Line 64, delete "BE" and insert -- UE --, therefor.

IN THE CLAIMS

In Column 14, Line 33, in Claim 18, delete "to;" and insert -- to: --, therefor.

Signed and Sealed this
Twelfth Day of January, 2016

Michelle K. Lee
*Director of the United States Patent and Trademark Office*